R. P. PERRY.

COMPOSITE FELT AND PROCESS OF MAKING THE SAME.

APPLICATION FILED JUNE 3, 1922.

Reissued Sept. 26, 1922. 15,461.

INVENTOR

Ray P. Perry

BY

Chas. W. Mortimer

ATTORNEY

Reissued Sept. 26, 1922. Re. 15,461

UNITED STATES PATENT OFFICE.

RAY P. PERRY, OF UPPER MONTCLAIR, NEW JERSEY, ASSIGNOR TO THE BARRETT COMPANY, A CORPORATION OF NEW JERSEY.

COMPOSITE FELT AND PROCESS OF MAKING THE SAME.

Original No. 1,288,158, dated December 17, 1918, Serial No. 162,121, filed April 14, 1917. Application for reissue filed June 3, 1922. Serial No. 565,736.

*To all whom it may concern:*

Be it known that I, RAY P. PERRY, a citizen of the United States, residing at Upper Montclair, in the county of Essex and State of New Jersey, have invented certain new and useful Improvements in Composite Felts and Processes of Making the Same, of which the following is a specification.

This invention relates to dry felts or papers used for making roofing or construction materials or for use as sheathing or building papers and for other uses. The felt which is the object of my invention contains, while still in the dry state, a predetermined proportion of bituminous material in comminuted form, as in filamentary form, for example.

Such bituminous dry felts or papers have been described in the specification of the Letters Patent No. 1,305,404, granted to me June 3, 1919.

In the manufacture of dry felts containing a certain proportion of bituminous material in comminuted form, difficulty is sometimes experienced in manufacturing such felts due to the fact that in the drying operation, which is a necessary step in the manufacture of such felts, if the felt contains a high percentage of bituminous material, such as pitch or asphalt, the same often sticks or adheres somewhat to the hot drying rolls with the result that such rolls collect some bituminous material and may, as a result of such collected material, injure or damage the surface of the roofing material. Such adhesion also reduces the heat transmission and hence the efficiency of such rolls for drying purposes. This difficulty is experienced especially when the dry felt, containing the comminuted bituminous material, has a high percentage of such material, though some difficulty may be experienced with felts containing a lower percentage of such bituminous material especially where the drying rolls are very hot.

By my method such difficulties are entirely avoided. Moreover, it is possible by my method to prepare a dry felt or paper containing a very large percentage of bituminous material in comminuted form. In fact in some cases a larger percentage may be obtained than would be at all possible or feasible without the application of my invention.

These, and other desirable objects, are obtained in the following manner:

Instead of making the felt in a single uniform sheet or layer consisting of a predetermined mixture of bituminous filaments or bituminous material in any other comminuted form added to the usual pulp mixture consisting of rags and paper, I make the dry bituminous felt in the form of a composite sheet. My mode of procedure is as follows:

Instead of having a single forming cylinder and couche roll, I have a plurality of such cylinders and corresponding couche rolls, generally three in number. The composite sheet which is the object of my invention is made in three layers generally. The intermediate layer is formed with a very high percentage of bituminous comminuted material in the same. The surface layers, however, either contain no bituminous material at all or contain such material in a percentage low enough to prevent any undesired adhesion of such material or layers to the drying rolls when the composite felt is being dried. In operation the three layers comprising an inner layer rich in bituminous material and two outer layers either containing no such material at all or containing only a slight quantity of such material, are formed and more or less matted or felted together in the wet state and then passed to the heated drying rolls together where, under the action of the drying rolls, the layers are further cemented or fused together into a single composite sheet. This cementing is facilitated by the fact that the intermediate layer rich in bituminous material is slightly softened or fused by the heat from the drying rolls and accordingly acts as a cementing agent. For a similar reason it is possible by my process to make a felt of any desired thickness, since the usual difficulty experienced in the splitting apart of felts of great thickness when formed in separate sheets or layers in a several-cylinder paper machine, is avoided due to the cementing action of the intermediate layer or layers rich in bituminous material. No matter how thick the composite sheet may be, the intermediate layer prevents any separation or splitting apart of the component sheets after the formation of the felt since said layer acts as a cementing agent.

My invention comprises the product as well as the process.

Referring to the drawing where I have illustrated my invention, Figure 1 shows diametrically a device wherein my process may be practised and my product may be produced.

Figure 1:
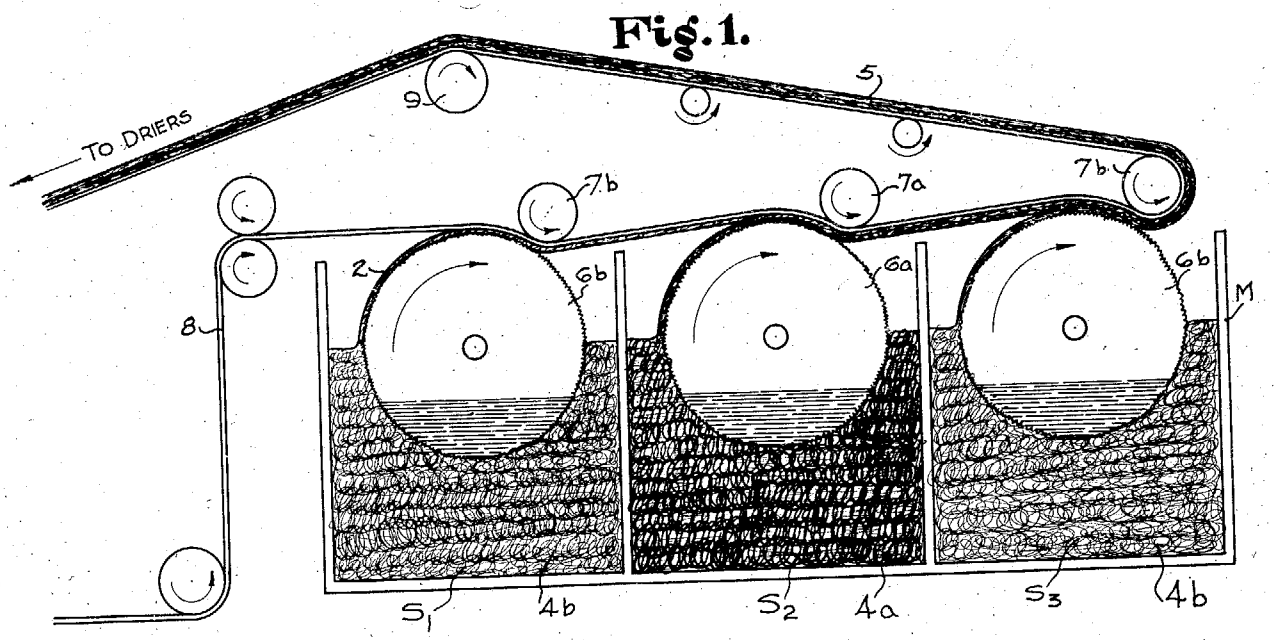
Figure 3:
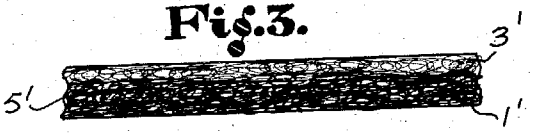
Fig. 3 shows in magnified cross-section a modified composite sheet made up of two layers only.
Figure 2:
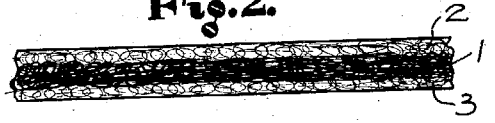
Fig. 2 shows in magnified cross-section the composite felt which is the result of my invention.

The composite sheet which is the object of my invention is made as follows:

1 is a layer containing a large percentage of comminuted bituminous material, such as soft or hard coal tar pitch, asphalt or other solid bituminous material in the form of regular or irregular fragments, powder, shot, filaments, or fragments of the same, etc., as described in Letters Patent No. 1,305,404, above referred to. Hereafter, in the specification and claims I shall refer to these classes of materials under the common designation of "bituminous materials".

The stock from which this layer is made, in addition to comminuted bituminous material (generally amounting, if desired, to more than 10% and less than 90% of the total stock), consists of a mixture of rags and paper in the form of a watery pulp, the whole being intimately mixed together, all as described in my copending application above referred to. As a result of the addition of comminuted bituminous material, especially when such material is in filamentary form, I may use a larger proportion of paper or hard stock, and a smaller proportion of rags or soft stock than has hitherto been deemed feasible, and still leave the roofing material open and porous enough for subsequent saturation. This result is due to the fact that the particles of bituminous material, especially when the same are of filamentary form, are scattered through the roofing material and serve, to a certain extent, to spread and keep such material open and porous. I may use, for example, a mixture containing 50% of bituminous material in comminuted form, 25% rags and 25% paper, in the form of a watery pulp, with considerable success.

This mixture $S_2$ is placed in the inner cylinder vat $4_a$ of a several-cylinder paper-making machine M, the outer cylinder vats $4_b$ containing a watery pulp of paper-making material containing either no bituminous material in comminuted form, such as filaments of pitch or fragments thereof, or else containing such material in proportions which will not cause the layers 2, 3 formed from the mixtures $S_1$ and $S_3$ in the cylinder vats $4_b$, to adhere to the drying rolls during the drying operation. Any number or arrangement of the cylinder vats $4_b$, $4_a$ $4_b$ may be employed, three being shown as arranged in the drawing merely by way of illustration.

Within the cylinder vats $4_b$, $4_a$, $4_b$ are the respective perforated cylinders $6_b$, $6_a$, $6_b$, cooperating with the wet felt endless belt 8 and the couche rolls $7_b$, $7_a$, $7_b$ to form the component layers 2, 1 and 3, respectively, of the composite sheet 5. The layer 2 poor in comminuted bituminous material or containing no such material at all is formed from the material $S_1$, in the vat $4_b$, being carried on the under side of the "wet felt" 8 until it picks up the layer 1 rich in bituminous material, the layer 1 being made from the material $S_2$ in the vat $4_a$ The wet felt 8, now carrying a composite sheet made up of the two layers 2, 1, the layer 2 being in contact with the felt and the layer 1 being in contact with the layer 2, picks up the further layer 3, poor in comminuted bituminous material or containing no such material at all, so that the composite sheet 5, after it leaves the last couche roll, consists of three layers, 2, 1, 3, the intermediate layer 1 being rich in comminuted bituminous material and the outer layers 2, 3 being poor in such material, or containing no such material at all. After leaving the wet felt, the composite sheet 5 is dried in the manner customary in the manufacture of paper by being passed over a series of steam-heated drying rolls or in any other desired manner. In practice the layer 1 contains generally more than 30% of comminuted bituminous material and the outer layers 2, 3 less than 40% of such bituminous material. These percentages, however, may be varied at will, the controlling condition being that while the intermediate layer 1 may be as rich as desired in comminuted bituminous material, the outer layers 2, 3, should contain a low enough percentage of comminuted bituminous material to substantially prevent the composite felt from sticking to the drying rolls during the drying operation. Where the drying is caused to proceed from a drying roll or rolls or other drying means contacting with but one side of the composite felt, a composite felt 5′ may be made consisting of but one layer 2′ of material poor in comminuted material and another layer 1′ rich in such material, the composite sheet 5′ passing over the drying roll or other heating device in contact with that side of the composite sheet which is covered by the layer 2′ poor in comminuted bituminous material.

The action of the drying roll or rolls helps to cause the component layers to unite, and the bituminous material present in the layer rich in bituminous material furthers the uniting action by being somewhat softened or fused by the heat from the drying rolls, thereby cementing the composite sheet into a strong unitary structure. The composite sheet whether consisting of two, three or more layers, may be saturated with water proofing material or coated with such or analogous material, or both, in the manner usual in the manufacture of so-called rubber roofings. Usually the waterproofing and coating material consists of bituminous materials such as pitch or asphalt. While the thickness of the composite layers may be varied at will, and while the relative proportions in the thickness of the complete sheet or each of the component layers may be varied as desired, it is customary to make the layer rich in bituminous material comparatively thick and the layer or layers poor in comminuted bituminous material comparatively thin, thereby providing the composite sheet with a maximum content of bituminous material.

The component sheet, however, need not be saturated but may be used in the dry state. For example, I may make dry sheathing or dry paper by my process. In such case the watery pulp stock may for all purposes be made largely or entirely of old papers or similar material and, if desired, the outer layers may be colored red, blue, etc., either by mixing color with the stock or by later applying the same after the sheets are formed. The interior layer or layers may be rich in bituminous material in solid form and serve to make the sheathing paper more damp resistant, and have other advantages. The composite sheet may obviously be made in various combinations and used for a variety of purposes.

Throughout the specification and claims wherever I refer to material as being "poor" in bituminous matter, or as containing a "smaller" or a "comparatively small" proportion of such matter, I mean to include by such terms those instances where the material contains no bituminous matter at all.

What I claim is:—

1. A composite strip of paper comprising a layer of material containing a predetermined quantity of fusible bituminous matter in comminuted form, and at least one other layer of material united to the first layer and containing a smaller proportion of bituminous material than said first-mentioned layer, substantially as described.

2. A composite strip of paper comprising a layer of material containing a predetermined quantity of comminuted bituminous matter in comminuted form, and at least one other layer of material united to the first layer, and containing a smaller proportion of bituminous matter in comminuted form than said first-mentioned layer, substantially as described.

3. A composite strip of paper comprising a layer of material containing a predetermined quantity of comminuted bituminous matter and two other layers of material united to the first layer, one on each side of said first-mentioned layer and each containing a smaller proportion of bituminous matter in comminuted form than said first-mentioned layer, substantially as described.

4. A composite strip of paper comprising a layer of fibrous material containing comminuted asphalt, and at least one other layer of fibrous material united to the first layer and containing a smaller proportion of asphalt than said first-mentioned layer, substantially as described.

5. A composite strip of paper comprising a layer of fibrous material containing comminuted asphalt, and two other layers of fibrous material united to the first layer, one on each side of said first-mentioned layer and each containing a smaller proportion of asphalt than said first-mentioned layer, substantially as described.

6. A composite strip of paper comprising a layer of material containing between 30% and 90% of fusible comminuted bituminous matter, and at least one other layer of material united to the first layer and containing less than 40% of bituminous matter, substantially as described.

7. A composite strip of paper comprising a layer of material containing more than 30% of fusible comminuted bituminous matter and two other layers of material united to the first layer, one on each side of said first layer, and containing each less than 40% of bituminous matter, substantially as described.

8. The process of making paper which comprises the steps of forming a layer of material containing a comparatively large proportion of fusible comminuted bituminous matter, forming a second layer of material containing a comparatively small quantity of bituminous matter, and causing said layers to become united in an integral sheet, substantially as described.

9. The process of making paper which comprises the steps of forming a layer of material containing a comparatively small quantity of bituminous matter, forming a second layer of material containing a comparatively large proportion of fusible comminuted bituminous matter, forming a third layer of material containing a comparatively small proportion of bituminous matter, the second-mentioned layer being located between the other two layers, and causing said layers to become united into a single composite sheet, substantially as described.

10. The process of making paper which comprises the steps of forming a layer of material containing a comparatively large proportion of comminuted bituminous matter, forming a second layer of material containing a comparatively small quantity of comminuted bituminous matter, and causing said layers to become united in an integral sheet, substantially as described.

11. The process of making paper which comprises the steps of forming a layer of material containing a comparatively small quantity of comminuted bituminous matter, forming a second layer of material containing a comparatively large proportion of comminuted bituminous matter, forming a third layer of material containing a comparatively small proportion of comminuted bituminous matter, the second-mentioned layer being located between the other two layers, and causing said layers to become united into a single composite sheet, substantially as described.

12. The process of making paper which comprises the steps of forming a layer of material containing a comparatively small proportion of comminuted bituminous matter, forming a second layer of material containing a comparatively large proportion of comminuted bituminous matter, and heating said layers to cause the same to become united into a unitary sheet, the union being assisted due to the cemented action of the comminuted bituminous material present in the sheet, substantially as described.

13. The process of making paper, which consists in forming a sheet containing comminuted asphalt, applying thereto one or more layers of paper containing a smaller proportion of asphalt, and drying the same.

14. The process of making paper, which comprises the steps of forming on a paper-making machine a layer of fibrous material containing more than 30% of comminuted asphalt, forming a second layer of fibrous material containing a smaller proportion of asphalt, and causing said layers to become united, substantially as described.

15. The process of making paper which comprises forming in a paper-making machine a layer of fibrous material, rich in comminuted bituminous material, forming at least one other layer of fibrous material on a paper machine, matting or felting said layers together in a wet state, and then passing over heated drying rolls to further cement the layers together into a single composite sheet.

16. The process of making paper which comprises forming three layers of fibrous material in a paper-making machine, the inner layer being rich in comminuted bituminous material, matting or felting the three layers together in the wet state, and then further cementing the layers into a single composite sheet by passing over heated drying rolls.

17. The process of making paper which comprises the steps of forming on a paper-making machine a layer of fibrous material containing a comparatively large proportion of comminuted material, forming a second layer on a paper-making machine of fibrous material containing a comparatively small quantity of comminuted bituminous material, and causing said layers to become united in an integral sheet by matting or felting them together in the wet state, and then further cementing them together by passing over heated drying rolls.

18. The process of making paper which comprises forming in a paper-making machine a layer of fibrous material, rich in comminuted asphalt, forming at least one other layer of fibrous material on a paper machine, matting or felting said layers together in a wet state, and then passing over heated drying rolls to further cement the layers together into a single composite sheet.

19. The process of making paper which comprises forming three layers of fibrous material in a paper-making machine, the inner layer being rich in comminuted asphalt, matting or felting the three layers together in the wet state, and then further cementing the layers into a single composite sheet by passing over heated drying rolls.

20. The process of making paper which comprises the steps of forming on a paper-making machine a layer of fibrous material containing a comparatively large proportion of comminuted asphalt, forming a second layer on a paper-making machine of fibrous material containing a comparatively small quantity of comminuted asphalt, and causing said layer to become united in an integral sheet by matting or felting them together in the wet state, and then further cementing them together by passing over heated drying rolls.

In testimony whereof I affix my signature.

RAY P. PERRY.